(12) United States Patent
Doms (10) Patent No.: US 9,118,153 B2
(45) Date of Patent: Aug. 25, 2015

(54) RENEWABLE ENERGY FORECASTING SOCKET

(71) Applicant: Andreas Doms, Dresden (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 13/942,384

(22) Filed: Jul. 15, 2013

(65) Prior Publication Data

US 2015/0015404 A1    Jan. 15, 2015

(51) Int. Cl.
| | |
|---|---|
| *G08B 21/00* | (2006.01) |
| *H01R 13/717* | (2006.01) |
| *H01R 13/66* | (2006.01) |
| *G08B 5/36* | (2006.01) |
| *G06Q 50/06* | (2012.01) |
| *G06Q 10/04* | (2012.01) |
| *H01R 29/00* | (2006.01) |

(52) U.S. Cl.
CPC ............ *H01R 13/7175* (2013.01); *G08B 5/36* (2013.01); *H01R 13/6691* (2013.01); *G06Q 10/04* (2013.01); *G06Q 50/06* (2013.01); *H01R 29/00* (2013.01)

(58) Field of Classification Search
CPC ............................... G06Q 50/06; G09Q 10/04
USPC ............................................ 340/657; 700/295
See application file for complete search history.

(56) References Cited

U.S. PATENT DOCUMENTS

| | | | |
|---|---|---|---|
| 5,809,449 A * | 9/1998 | Harper ........................... 702/63 |
| 2003/0048587 A1 * | 3/2003 | Lai ................................. 361/42 |
| 2007/0276547 A1 * | 11/2007 | Miller ........................... 700/295 |
| 2012/0248210 A1 * | 10/2012 | Warren et al. ................. 236/1 C |
| 2014/0218209 A1 * | 8/2014 | Koch ....................... 340/870.02 |

* cited by examiner

*Primary Examiner* — Shirley Lu
(74) *Attorney, Agent, or Firm* — Fountainhead Law Group PC (57) ABSTRACT

An electric socket can include a visual indicator capable of displaying time-series forecast information that forecasts a property or attribute related to the power being sourced from an energy provider. The information being displayed on the visual indicator can help an energy consumer decide whether to use an appliance now by plugging it into the electric socket or wait until some optimal time in the future to plug the appliance in.

19 Claims, 8 Drawing Sheets

RENEWABLE ENERGY FORECASTING SOCKET

BACKGROUND

Unless otherwise indicated herein, the approaches described in this section are not prior art to the claims in this application and are not admitted to be prior art by inclusion in this section.

The use of renewable energy sources such as solar, wind, and hydro have been on the rise. For example, many consumers have begun installing solar panels on their residential homes. However, the energy provided by renewable energy sources is often insufficient to satisfy all the energy needs of the consumer and thus energy providers supply consumers a combined solution of both traditional and renewable energy sources. Environmentally conscious consumers still prefer using renewable energy sources over traditional non-renewable energy sources such coal and gas. However, there is no way for them to determine what type of energy is being provided from the electric socket at a given point in time.

SUMMARY

Embodiments of the present invention display energy information on the housing of an electric socket. In one embodiment, the electric socket includes a receptacle configured to provide power from an energy provider to an electronic device, the power being sourced from at least one of a renewable energy source and a non-renewable energy source. The electric socket further includes a visual indicator configured to display time-series forecast information forecasting a property of the power provided from the energy provider over a predefined period of time. In one example, the property of the power can describe the mixture of the renewable energy source and the non-renewable energy source that is being provided at a particular point in time. In another example, the property of the power can describe the price for one unit of power. In one example, the visual indicator can be an LED string array containing a series arrangement of LED segment. In one example, each LED segment from the series arrangement represents a portion of the predefined period of time. In another example, each LED segment from the series arrangement changes color according to the forecasted property. In one example, the LED string array is arranged around the perimeter of the receptacle. In one example, the electric socket further includes a network interface configured to receive data from the energy provider to generate the time-series forecast information. In one example, the data is received via a wide area network while in another example, the data is received via a local area network.

In another embodiment, a method or computer readable medium is described for displaying information on an electric socket. The method includes receiving, from an energy provider, data forecasting a property associated with power available from the energy provider, the power being sourced from at least one of a renewable energy source and a non-renewable energy source, generating, by the processor and from the received data, time-series forecast display information describing the forecasted property over a predefined period of time, and presenting, by the processor, the time-series forecast display information on a visual indicator disposed on the electrical socket. In one example, the property describes the mixture of the renewable energy source and the non-renewable energy source. In another example, the property describes the price for one unit of power. In one example, the visual indicator is a LED string array containing of a series arrangement of LED segments, wherein each LED segment from the series arrangement represents a portion of the predefined period of time. In one example, the data is received via a wide area network.

The following detailed description and accompanying drawings provide a better understanding of the nature and advantages of the present invention.

DETAILED DESCRIPTION

Described herein are techniques for presenting, in a time-series format, forecasting information relating to the energy being provided by an energy provider. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

An electric socket is described for presenting forecasting information to the consumer. The forecasting information can be reviewed by the energy consumer to can make an informed decision on whether to plug an appliance into the electric socket. The forecasting information can include the energy mix that is currently being provided at the electric socket. For example, the energy mix can be 80% from a renewable energy source and 20% from a non-renewable energy source. The forecasting information can also include a prediction or forecast of the energy mix that will be provided at the socket at a later point in time. To predict or project the energy mix, statistics that have been collected about the energy mix can be analyzed. The analysis can be performed at the energy provider or alternatively at the energy consumer. The forecasting information can also include the price that the energy consumer would be paying for power at a given point in time. For example, the forecasting information can inform the energy consumer that power will be cheaper an hour later rather than now. With the forecasting information readily available at the electric socket, a consumer can easily review the forecasting information when deciding whether to plug an appliance into the electric socket. This provides valuable information to the consumer that allows the consumer to make a conscious effort to use a particular energy source (such as renewable energy) or to save money by using power when it is less expensive.

Figure 1:
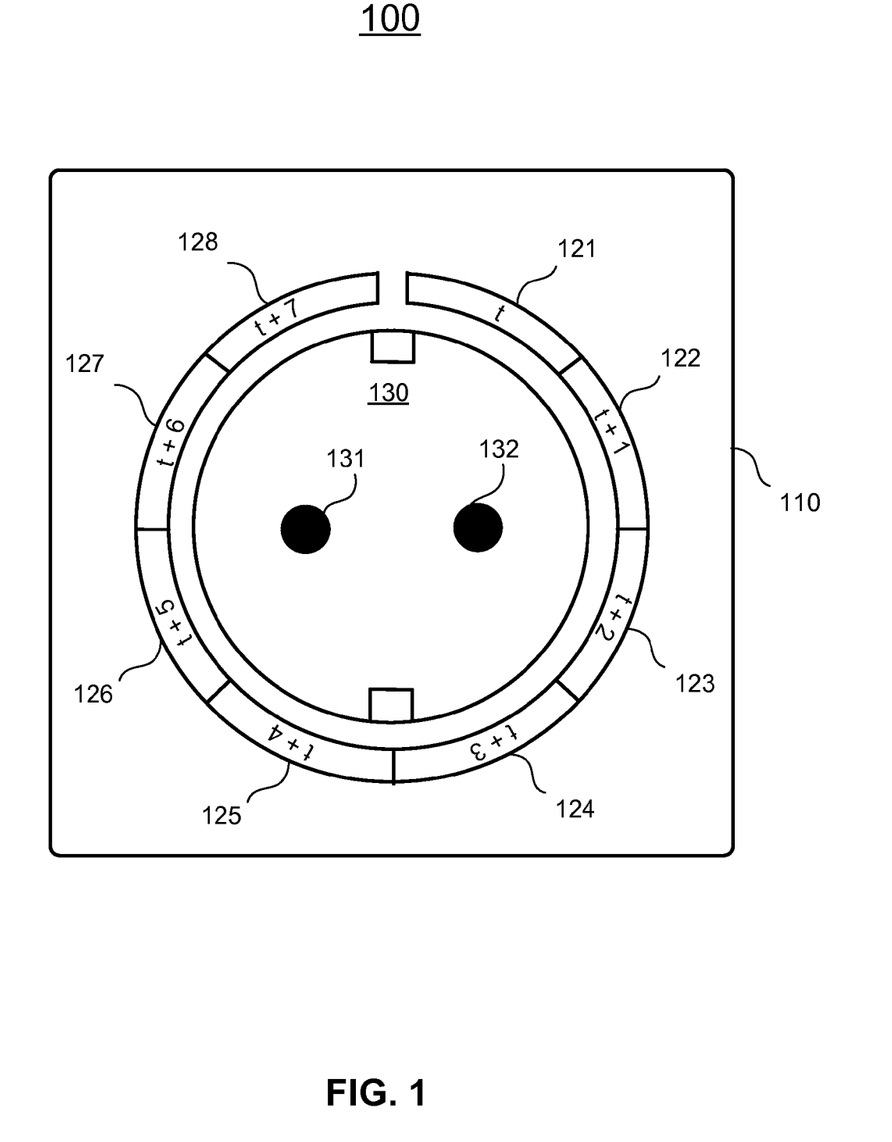
FIG. 1 illustrates an exemplary electric socket.

FIG. 1 illustrates an exemplary electric socket. Socket 100 can be installed in a building structure such as a residential home or a commercial building to replace a conventional socket. Socket 100 includes housing 110 which includes the components of a conventional socket. For example, housing 110 includes a recessed area 130 configured to receive a plug. The recessed area 130 includes receptacles 131 and 132 configured to receive pins of a plug that belongs to an appliance. When the pins come in contact with the receptacles, the receptacles are energized and electricity is provided to the appliance. Receptacles 131 and 132 can be recessed as a safety feature to prevent energy consumers from experiencing electric shock by accidentally contacting the terminals.

Housing 110 further includes an LED string array containing a series arrangement of LED segments 121 through 128. As shown here, the LED string array can be disposed along the perimeter of recessed area 130. Alternatively, the LED string array can be disposed elsewhere or in a different configuration on housing 110. For example, the LED string array can be disposed horizontally along an edge of housing 110. In one embodiment, the LED string array can be configured to display information relating to the energy being provided to socket 100 from the energy provider. The information can include current and forecasted values associated with an attribute of the energy provider. In one example, the attribute can be the estimated energy mix that is being provided currently or in the future. For instance, the current energy mix can be 20% solar, 10% wind, and 70% gas in the morning and change to 40% solar, 15% wind, and 45% gas in the afternoon. In another example, the attribute can be what the energy provider is charging per watt of power, now or forecasted in the future.

In one embodiment, each LED segment in LED string array can represent a value that is assigned to the attribute by the energy provider for a predefined period of time. As shown in FIG. 1, LED segment 121 represents time segment 't,' LED segment 122 represents time segment 't+1,' segment 123 represents time segment 't+2' and so forth. Time segment 't' can be the period of time between now and a unit of time in the future. The unit of time can be a minute, fifteen minutes, an hour, a day, or other measurement of time. For instance if the unit of time is an hour, then LED segment 121 would represent the period of time between current time and an hour in the future. Similarly, LED segment 122 would represent the period of time between an hour in the future and two hours in the future. Together, the entire series arrangement of LED segments 121 through 129 represents a time-series forecast of the attribute (or property) over a predefined period of time.

Each LED segment includes one or more multi-color LEDs that are capable of emitting visible light in different colors. Each color can represent a value or a range of values. For example if the attribute is energy mix, a color of green can represent a period of time where the energy mix is at least 50% from renewable energy sources, a color of yellow can represent a period of time where the energy mix is 20-50% from renewable energy sources, while a color of red can represent a period time where the energy mix is below 20% from renewable energy sources. The color that is emitted from an LED segment depends on the value assigned to the LED segment. Alternatively, each LED segment can include multiple LEDs that are configured as a digital number display. The number or numbers that are emitted by the LEDs depend on the value assigned to the attribute for a given time segment. Together, the color (or number) emitted by each LED segment can present a time-series forecast of values associated with the energy provider attribute (or property) which can be reviewed by the energy consumer in determining when to plug an appliance into the electric socket. In some embodiments, housing 110 can also include a touch sensor or other sensor, which when activated, activates the LED string array for a predefined period of time.

In another embodiment, housing 110 can also include a single LED segment that displays the energy consumer's total consumption so far. For example, a single LED segment containing a digital number display can present to the energy consumer the total amount of energy that has been used or the charges from the energy provider so far for this month, year, or other time interval. Alternatively instead of a digital number display, the amount can be represented by one or more multi-color LEDs, where the LEDs are green when the energy usage is below 70% of the consumer's predefined threshold, yellow is 70-100% of the threshold, and red is over the threshold. In one example, the single LED segment replace the LED string array. In another example, the single LED segment can be used in combination with the LED string array, where the single LED segment can be disposed along an edge of housing 110 while the LED string array is disposed along the perimeter of recessed area 130. In yet another example, the LED string array can be configured to perform both functionality. For instance, housing 110 can include a switch. When the switch is not triggered, the LED string array displays time-series forecast information for a property or attribute of the energy provider. When the switch is triggered, another property or attribute of the energy provider is displayed. For example, triggering the switch can result in all the LED segments of the LED string array to display a color corresponding to the energy consumer's total energy usage so far. This information can be dynamically retrieved from the energy provider or alternatively tracked by the energy consumer. In other examples, a locally cached value is stored by the energy consumer and periodically updated using updates provided from the energy provider.

Figure 2:
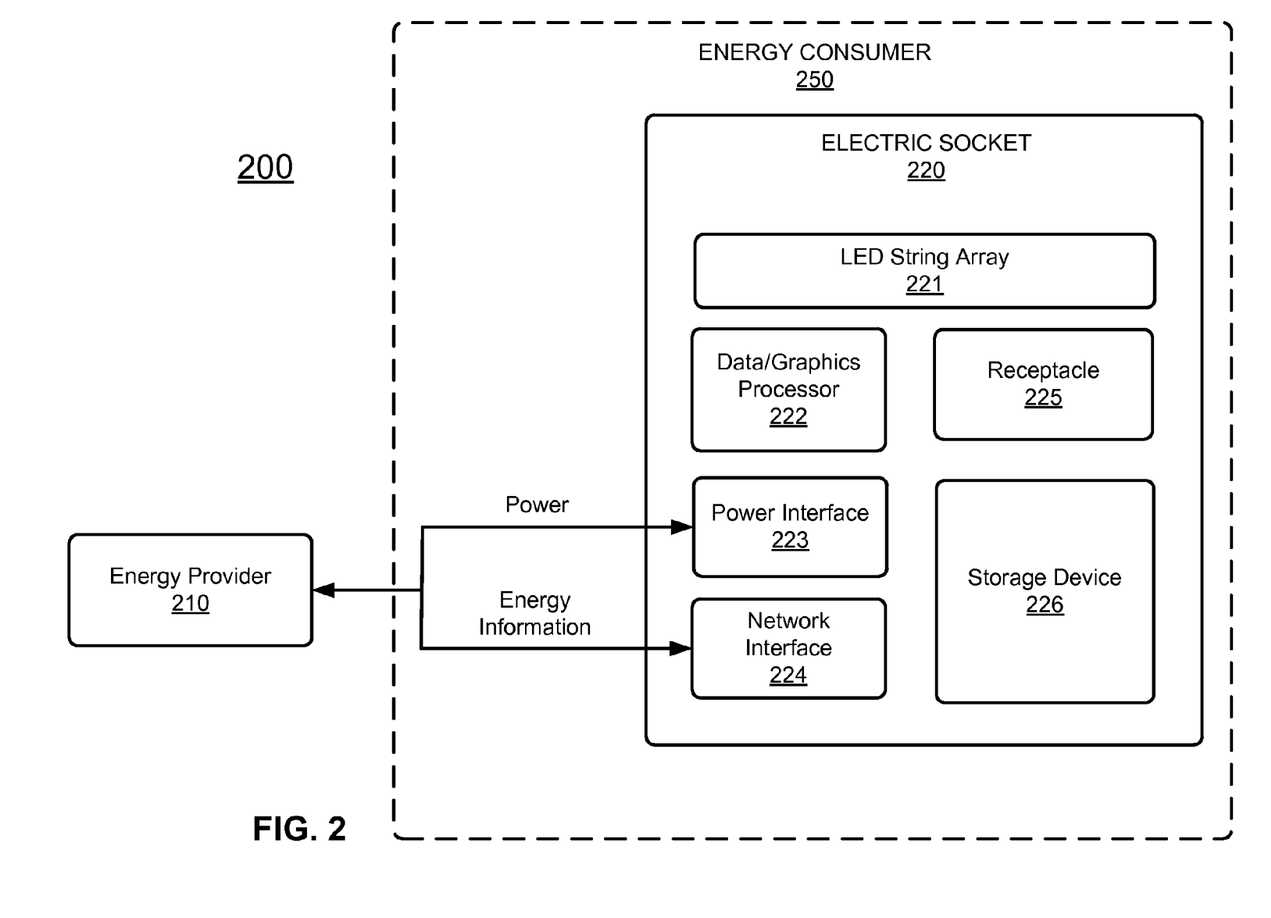
FIG. 2 illustrates an exemplary energy services system.

FIG. 2 illustrates an exemplary energy services system. Energy system 200 includes energy provider 210 and energy consumer 250. Energy provider 210 provides power to energy consumer 250. In some examples, the power can be exchanged for payment, the payment depending on a defined price structure. The power can come from a combination of energy sources, including renewable energy sources (e.g., wind, water, and solar) and non-renewable energy sources (e.g., gas and coal). The price for power can vary depending on the time of day. Similarly, the energy mix being provided can also vary depending on the time of day. For example, solar power may not be available in the evening time and as a result the energy mix from renewable energy sources can be lower during the evening. The energy mix or other energy information can be provided from energy provider 210 to electric socket 220 for processing and presentation to energy consumer 250. Energy consumer 250 can in turn decide when to consume energy based on the information being presented.

Energy provider 210 supplies power and energy information to energy consumer 250 through electric socket 220. Here, electric socket 220 can be similar or substantially similar to electric socket 100 of FIG. 1. Electric socket 220 can include components of a conventional socket such as power interface 223 that is configured to receive power supplied from energy provider 210 and receptacle 225 that is configured to power a connected appliance. When a plug of the appliance is inserted into receptacle 225, power is supplied from energy provider 210, through electric socket 220, to the energy provider 210. Electric socket 220 can further include other components including an LED string array 221 that is similar or substantially similar to the LED string array described in FIG. 1. LED string array 221 can be controlled by data/graphics processor 222, which receives instructions from storage device 226.

Electric socket 220 also includes network interface 224. Network interface 224 can be connected to energy provider 210 and be configured to receive energy information from energy provider 210. The energy information can include data that is used to control LED string array 221. For example, the energy information can include the energy mix that is currently being provided to the energy consumer and the projected energy mix for the upcoming predefined period of time. The energy information can also include the current and forecasted energy price information. Data/graphics processor 222 can perform graphics processing by assigning colors to different values of the energy mix by and then the colors can be output on LED string array 221. In another example, data/graphics processor 222 can perform data processing on the energy information to generate results that are specific to energy consumer 250. For instance, the energy mix information received can be combined with the price that this particular energy consumer is charged for power from different sources to calculate the price that the energy consumer would be paying per watt of power at different times of the day. This information can be presented to the energy consumer to make an informed decision of when is the optimal time to use power. The energy information can be provided from energy provider 210 on a predefined schedule, dynamically when new information is available, or on the request of energy consumer 250.

As shown here, power and energy information can be provided to energy consumer 250 via the same transmission medium. Both the power and the energy information can be transmitted to energy consumer 250 through a single cable that includes a portion for transmitting power and another portion for transmitting energy information. For example, the cable can include one or more wires for carrying power and one or more wires for carrying energy information. The cable can enter the building structure and be connected to electric socket 220, where the wire(s) for providing power are connected to power interface 223 and the wire(s) for providing energy information are connected to network interface 224. The connection from energy provider to energy consumer 250 can be bi-directional. For example, energy consumer 250 can send power to energy provider 210 if energy consumer 250 is producing more power than it is using. This can occur when the energy consumer is generating power through the user of solar, wind, or water. As another example, energy information can be collected on energy consumer 250 and subsequently reported back to energy provider 210. Energy provider 210 can use the energy information received to update data and statistics relating to the energy consumer.

Figure 3:
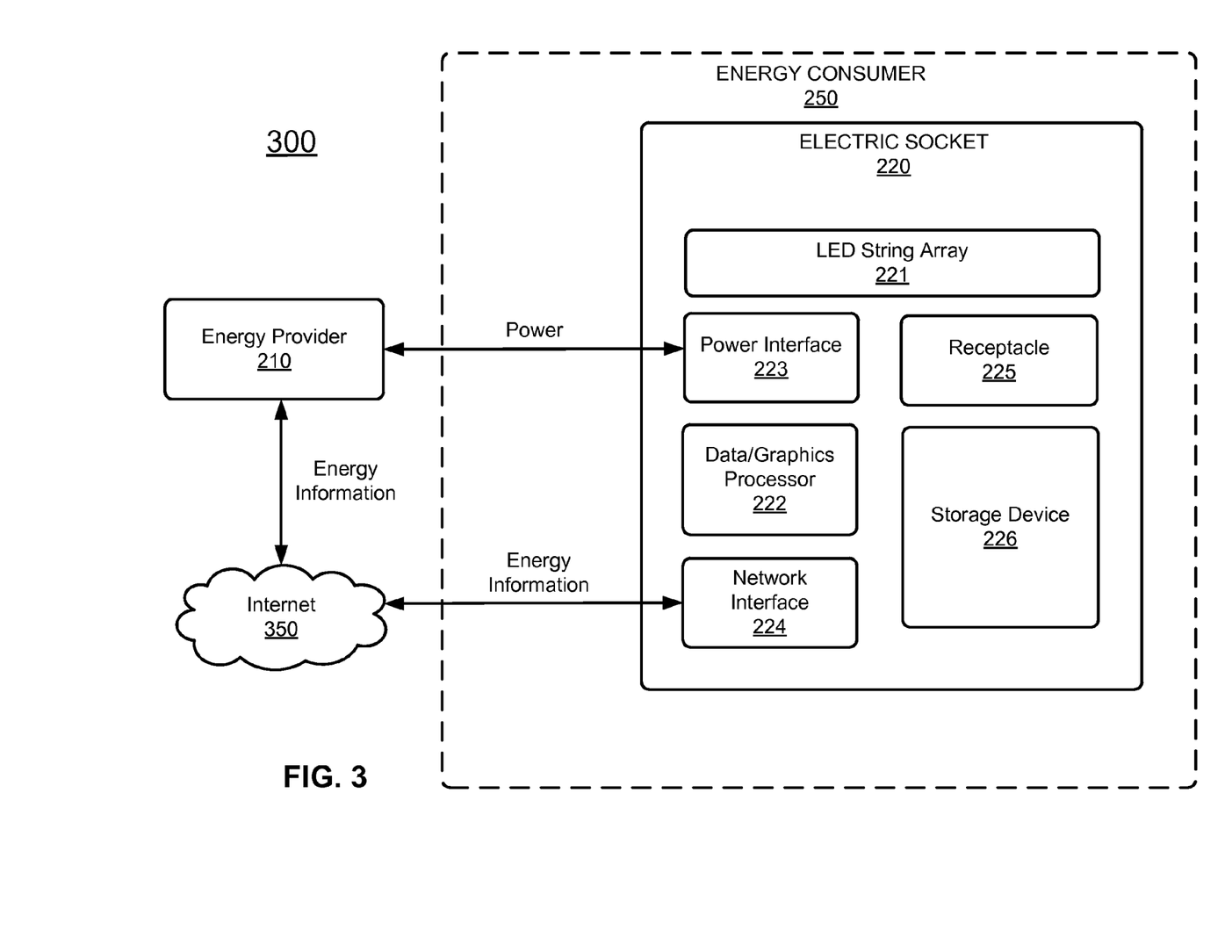
FIG. 3 illustrates another exemplary energy services system.

Alternatively, the power and energy information can be transmitted using different transmission mediums. FIG. 3 illustrates another exemplary energy services system. Similar to FIG. 2, system 300 includes energy provider 210 providing power and energy information to energy consumer 250 via electric socket 220. However, the power and energy information are being transmitted using different transmission mediums. Power is provided from energy provider 210 to electric socket 220 through a direct connection. The connection can be a physical cable as described in FIG. 2. In contrast, the energy information is being routed from energy provider 210, through internet 350, to electric socket 220. The communication between network interface 224 and internet 350 can be through a wide area network or a local area network. System 300 may be advantageous when upgrading a traditional energy services system that provides power to also provide energy information since many building structures have internet connectivity already and therefore communicating through the internet does not require additional wiring to be installed. Thus, energy information can be communicated between energy provider 210 and network interface 224 without having to update existing power cables to include data transmission cables or to install new cabling for transmitting energy information. In one embodiment, the data transmission between energy provider 210 and network interface 224 can be bi-directional. For example, electric socket 220 can transmit energy information to energy provider 210. The energy information received by energy provider 210 can be analyzed to generate energy use data related to energy consumer 250. As another example, electric socket 220 can transmit requests for energy information to energy provider 210.

Figure 4:
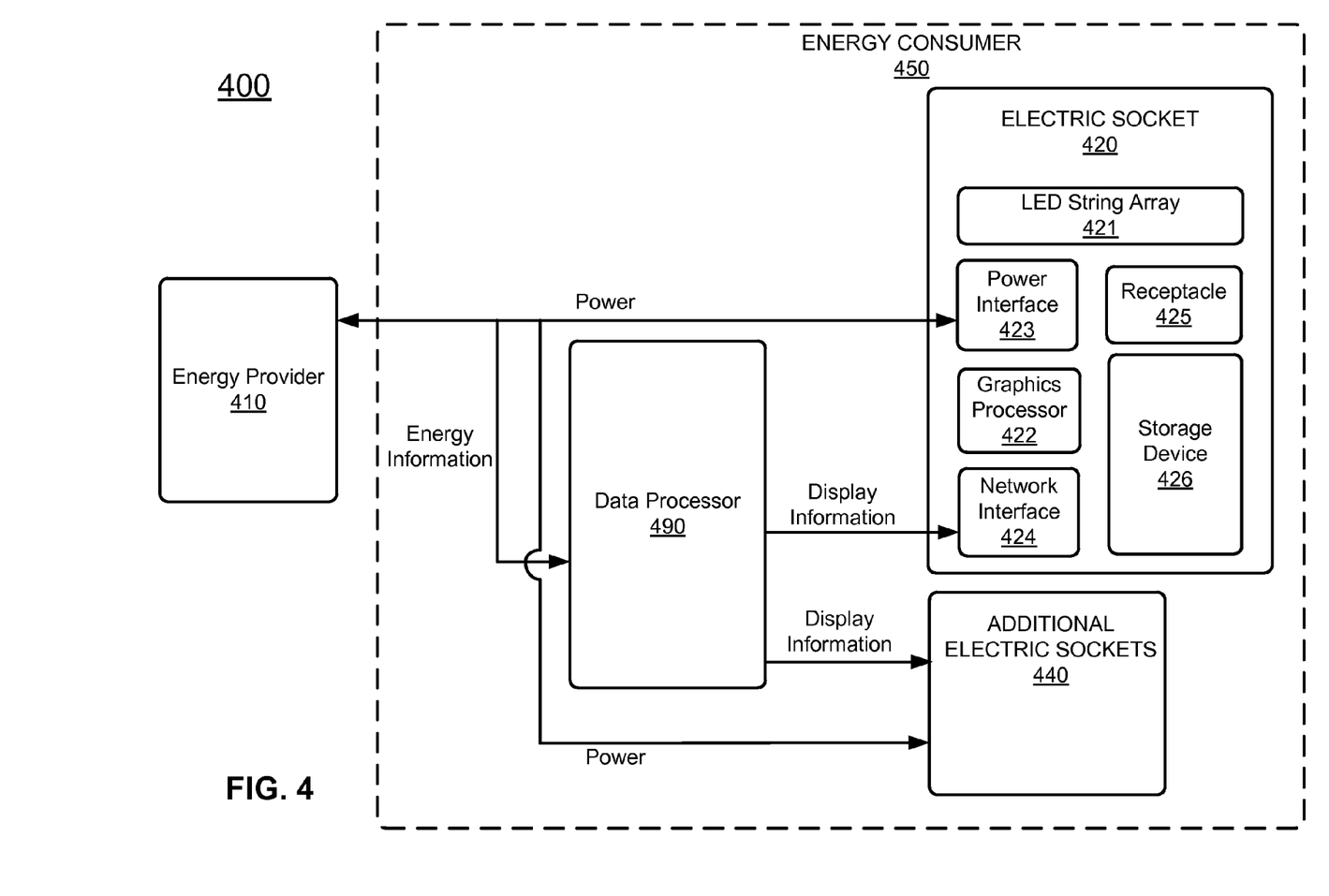
FIG. 4 illustrates another exemplary energy services system.

FIG. 4 illustrates another exemplary energy services system. System 400 includes energy provider 410, electric socket 420 and additional optional electric sockets 440. Electric socket 420 includes LED string array 421, graphics processor 422, power interface 423, network interface 424, receptacle 425, and storage device 426. Electric socket 420 and additional electric sockets 440 can be similar or substantially similar to electric socket 320 of FIG. 3. Similar to system 300 of FIG. 3, energy provider 410 can provide power to one or more electric sockets of energy consumer 450.

Energy consumer 450 further includes data processor 490 that is configured to receive energy information from energy provider 410. The energy information can be processed by data processor 490 to generate display information which in turn is used by the electric socket to control the LED string array. For example, the energy information can be the energy mix and/or the price energy consumer 450 pays for energy from different sources at different times of the day. Data processor 490 can process the energy information into a specific color or value that is to be displayed on each LED segment of the LED string array (e.g., display information). Information specific to the energy consumer such as the billing rate for different energy sources or the relationship between values and colors can be stored on energy consumer 450 and accessed by data processor 490 on demand. As a result, the resulting display can vary depending on the specific properties associated with each energy consumer. System 400 may be advantageous over other systems in that data processing is being performed once by data processor 490 rather than being performed at each electric socket. Furthermore, system 400 reduces the computational load on the energy provider by shifting the load to the energy consumer. This reduction can reduce bottlenecks at the energy provider that occur when the energy provider services many energy consumers.

As shown here, power and energy information can be provided to energy consumer 250 via the same transmission medium. Both the power and the energy information can be transmitted to energy consumer 450 through a physical cable. For example, one cable can be configured to transmit power while another is configured to transmit energy information. The power cable is connected to power interface of the electric sockets and the energy information cable is connected to data processor 490. The connections from energy provider to energy consumer 450 can be bi-directional. For example, energy consumer 450 can send power to energy provider 410 if energy consumer 450 is producing more power than it is using. This can occur when the energy consumer is generating power through the user of solar, wind, or water. As another example, energy information can be collected on energy consumer 450 and subsequently reported back to energy provider 410. Energy provider 410 can use the energy information received to update data and statistics relating to the energy consumer.

Figure 5:
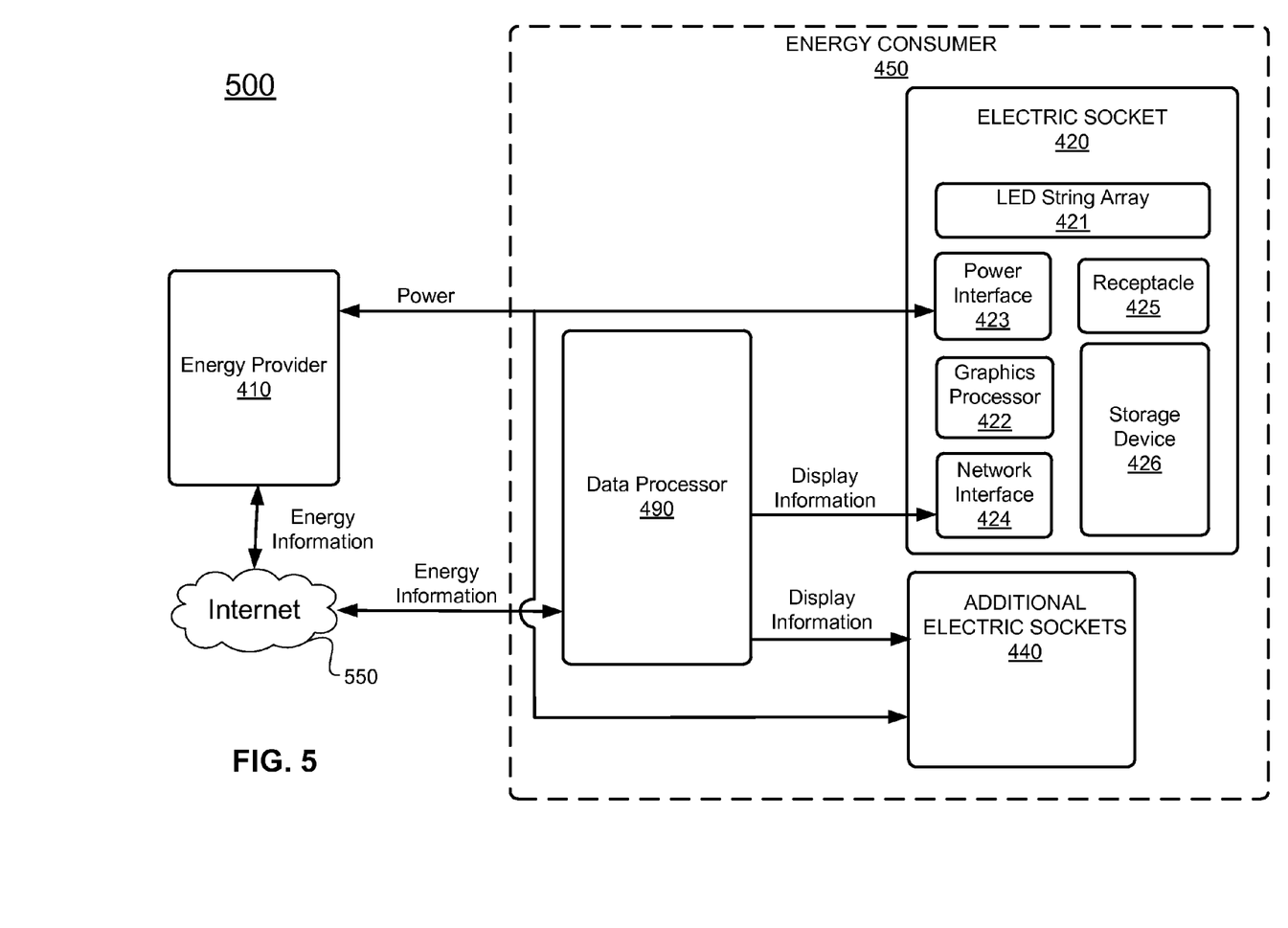
FIG. 5 illustrates another exemplary energy services system.

FIG. 5 illustrates another exemplary energy services system. Similar to system 400 of FIG. 4, system 500 also includes energy provider 410 providing power and energy information to energy consumer 450 via electric socket 420 and additional electric sockets 440. However, the power and energy information are being transmitted using different transmission mediums. Power is provided from energy provider 410 to electric socket 420 through a direct connection. The connection can be a physical cable as described in FIG. 4. In contrast, the energy information is being routed from energy provider 410, through internet 550, to data processor 490 for processing. The communication between data processor 490 and internet 550 can be through a wide area network or a local area network. System 500 may be advantageous when upgrading a traditional energy services system to also provide energy information since new cables do not need to be added between the energy provider and the energy consumer. Instead, the energy provider can transmit energy information to and receive energy information from the data processor via the internet. Thus, energy information can be communicated between energy provider 410 and network interface 424 without having to update existing power cables to include data transmission cables or to install new cabling for transmitting energy information. In one embodiment, the data transmission between energy provider 410, data processor 490, and network interface 424 can be bi-directional. For example, electric socket 420 can transmit energy information to data processor 490, which in turn transmits the energy information to energy provider 410 via internet 550. The energy information received by energy provider 410 can be analyzed to generate energy use data related to energy consumer 450. As another example, electric socket 420 or data processor 490 can transmit requests for energy information to energy provider 410.

Figure 6:
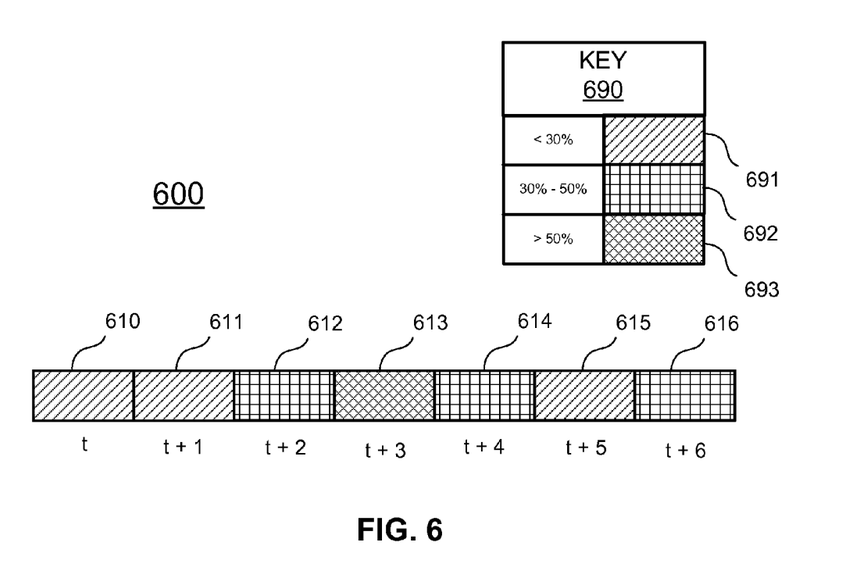
FIG. 6 illustrates an exemplary LED string array.

FIG. 6 illustrates an exemplary LED string array. LED string array 600 is configured to display the percentage of the energy provided that is renewable energy for a predefined period of time. LED string array 600 includes a plurality of LED segments 610 to 616. Each LED segment can be associated with a particular time segment. For example, LED segment 610 is associated with a time segment that begins now and ends an hour from now. Each LED segment is assigned a color (which for illustrative purposes is shown here as a pattern) according to key 690. If the energy mix for a given time segment is projected to be less than 30% renewable energy, then the LED segment associated with the given time segment displays color 691. Similarly, an energy mix that is between 30-50% renewable energy is associated with color 692 and an energy mix that is more than 50% renewable energy is associated with color 693. In one embodiment, LED string array 600 can be disposed on an electric socket to display information regarding the current and projected energy attributes. For example, LED string array 600 can be particularly disposed along the perimeter of a recessed area containing the receptacles. As another example, LED string array 600 can be particularly disposed along an edge of the housing of the electric socket. In yet other examples, LED string array 600 can be otherwise configured be disposed on the electric socket.

Figure 7:
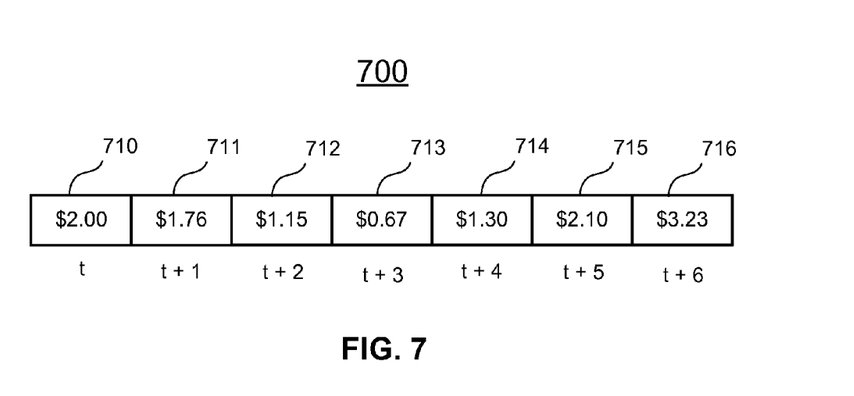
FIG. 7 illustrates another exemplary LED string array.

FIG. 7 illustrates another exemplary LED string array. LED string array 700 is configured to display the cost that is charged by the energy provider to this particular energy consumer for each unit of power consumed during different times of the day. LED string array 700 includes LED segments 710-716. Each LED segment is configured to display a number that represents a cost associated with each time segment. For example, LED segment 710 is associated with a time segment that begins now and ends an hour from now (or other predefined segment of time). The LED segments of LED string array 700, when viewed simultaneously, can provide an energy consumer with sufficient data to help determine the optimal time to power appliances through the electric socket. In one embodiment, LED string array 700 can be disposed on an electric socket to display information regarding the current and projected energy attributes. For example, LED string array 700 can be particularly disposed along the perimeter of a recessed area containing the receptacles. As another example, LED string array 700 can be particularly disposed along an edge of the housing of the electric socket. In yet other examples, LED string array 700 can be otherwise configured be disposed on the electric socket.

Figure 8:
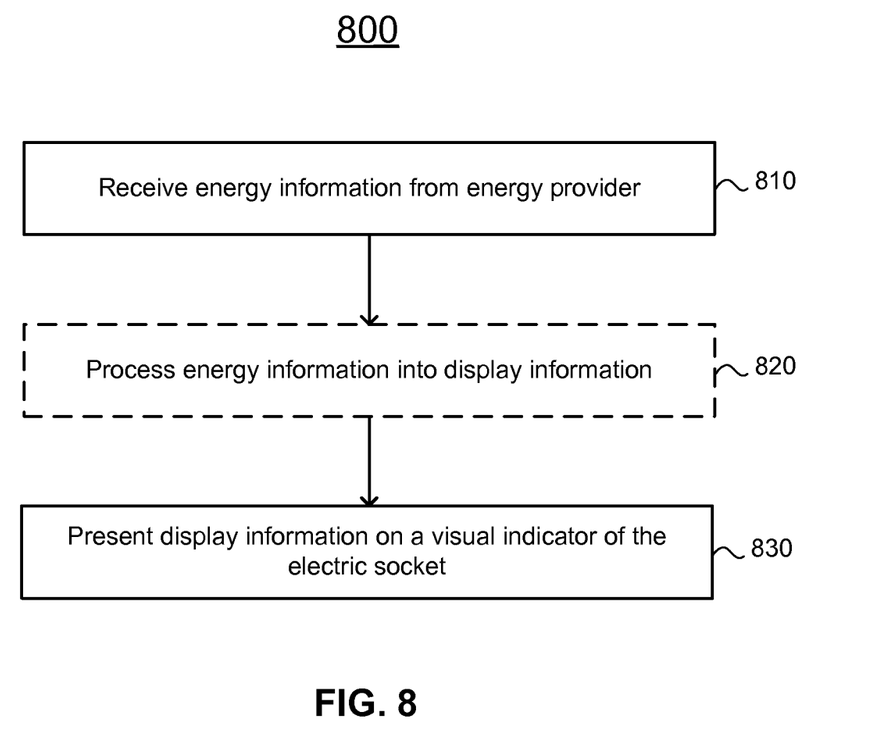
FIG. 8 illustrates an exemplary process for displaying information on an electric socket.

FIG. 8 illustrates an exemplary process for displaying information on an electric socket. Process 800 can be stored in storage device 226 of FIG. 2 and executed by data/graphics processor 222 of FIG. 2. The displayed information can provide current and future information related to the consumption of power by the energy consumer. Process 800 begins by receiving energy information from the energy provider at 810. The energy information can be received from an energy provider through a wired or wireless connection. In one example, the energy information can be received through the internet or other wide area network. The energy information can include data forecasting a property associated with power available from the energy provider. For example, the energy information can include the current and projected energy mix of the power provided by the energy provider. The power from the energy provider can be from a renewable energy source, a non-renewable energy source, or a combination of the two. As another example, the energy information can include the current and projected cost per watt of power.

Once the energy information has been received, the energy information can optionally be processed into display information at 820. In some examples, the energy information received is combined with locally stored data to generate the display information. In one example, energy mix information can be combined with unique cost rates associated with a particular energy consumer to calculate the cost to consume power at a given point in time. In another example, energy mix information is mapped to different colors according to a color map associated with the energy consumer. In one embodiment, the display information is time-series forecast display information describing the forecasted property over a predefined period of time.

The energy or display information can be presented on a visual indicator of the electric socket at 830. The visual indicator can be configured to display a time-series forecast of a property or attribute described in the energy or display information. In one example, the visual indicator is a LED string array containing a series arrangement of LED segments. Each LED segment from the series arrangement can represent a portion of the predefined portion of time. A LED segment can be configured to light up in a particular color that is associated with a given value for that predefined portion of time. Alternatively, the LED segment can be configured to display the value itself. In other examples, other visual indicators can be used. In one example, the visual indicator can be disposed around the perimeter of the receptacles. In another example, the visual indicator can be disposed along the edges of the electric socket. In other examples, information presented on the visual indicator can depend on a switch of the electric socket. The switch can trigger different information to be presented on the visual indicator.

Figure 9:
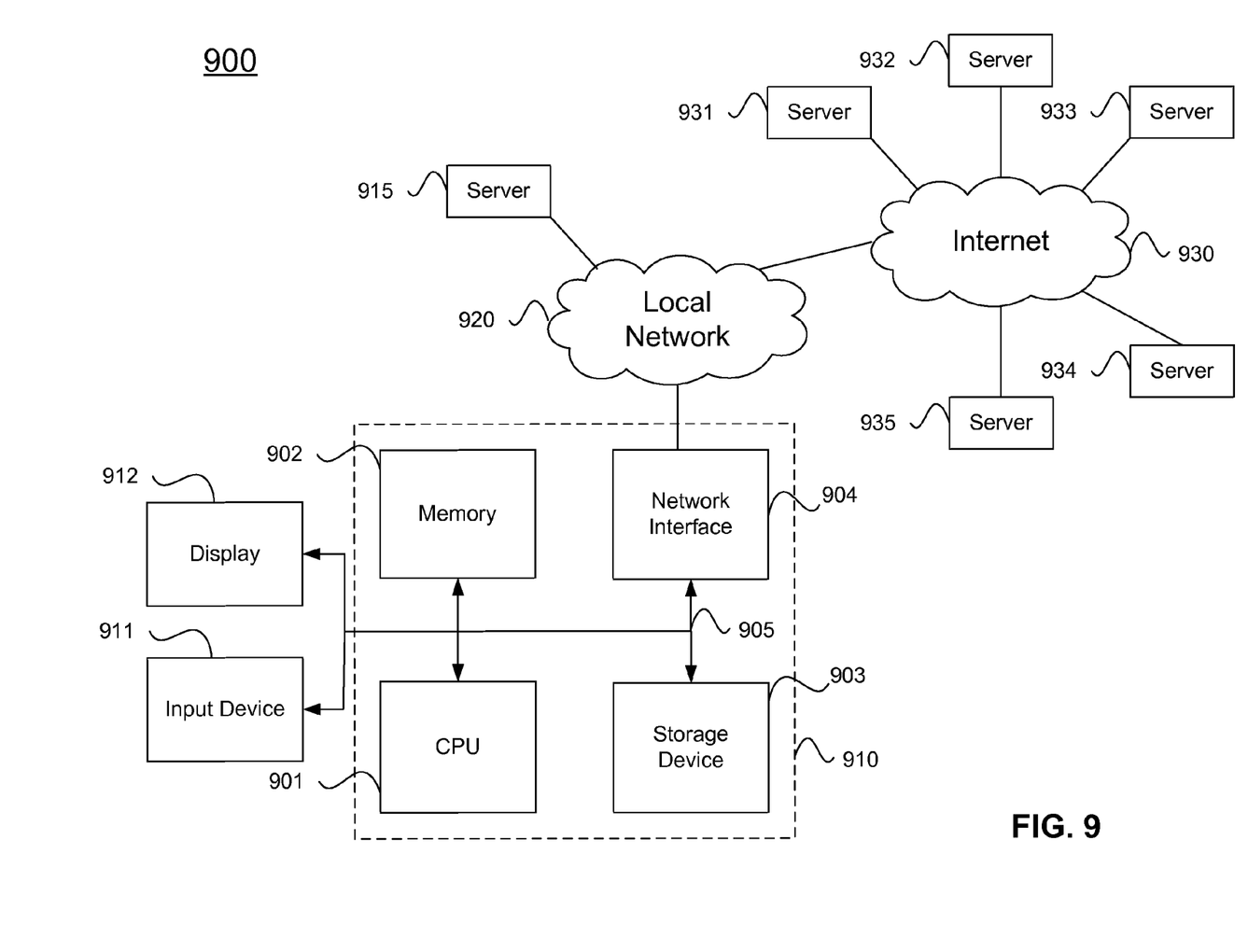
FIG. 9 illustrates an exemplary computer system.

An exemplary computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An electric socket, comprising:
    a receptacle configured to provide power from an energy provider to an electronic device, the power being sourced from at least one of a renewable energy source and a non-renewable energy source; and
    a LED string array disposed on the electric socket, the LED string array containing a series arrangement of LED segments that are configured to display time-series forecast information forecasting a property of the power provided from the energy provider over a predefined period of time to the electronic socket, wherein each LED segment within the LED string array is coupled to another LED segment within the LED string array and wherein each LED segment within the LED string array is configured to represent the property of the power at the electronic socket at a unique time segment from the predefined period of time.

2. The electric socket of claim 1 wherein the property describes the mixture of the renewable energy source and the non-renewable energy source.

3. The electric socket of claim 1 wherein the property describes the price for one unit of power.

4. The electric socket of claim 1 wherein an LED segment from the series arrangement is configured to change color according to a value associated with the property of the power at the unique time segment associated with the LED segment.

5. The electric socket of claim 1 wherein the LED string array is arranged around the perimeter of the receptacle.

6. The electric socket of claim 1, further comprising a network interface configured to receive data from the energy provider to generate the time-series forecast information.

7. The electric socket of claim 6, wherein the data is received via a wide area network.

8. The electric socket of claim 6, wherein the data is received via a local area network.

9. The electric socket of claim 1, wherein the LED array is arranged in a semi-circle.

10. A computer-implemented method for displaying information on an electric socket, comprising:
    receiving, from an energy provider, data forecasting a property associated with power available from the energy provider, the power being sourced from at least one of a renewable energy source and a non-renewable energy source;
    generating, by the processor and from the received data, time-series forecast display information describing the forecasted property over a predefined period of time; and
    presenting, by the processor, the time-series forecast display information on a LED string array containing a series arrangement of LED segments disposed on the electrical socket, wherein each LED segment within the LED string array is coupled to another LED segment within the LED string array and wherein each LED segment within the LED string array is configured to represent the property associated with the power from the energy provider at a unique time segment form the predefined period of time.

11. The computer-implemented method of claim 10 wherein the property describes the mixture of the renewable energy source and the non-renewable energy source.

12. The computer-implemented method of claim 10 wherein the property describes the price for one unit of power.

13. The computer-implemented method of claim 10 wherein the data is received via a wide area network.

14. The computer-implemented method of claim 10, wherein the LED array is arranged in a semi-circle.

15. A non-transitory computer readable medium comprising instructions, that when executed by a computer processor cause the computer processor to be configured for:
- receiving, from an energy provider, data forecasting a property associated with power available from the energy provider, the power being sourced from at least one of a renewable energy source and a non-renewable energy source;
- generating, from the received data, time-series forecast display information describing the forecasted property over a predefined period of time; and
- presenting the time-series forecast display information on a LED string array containing a series arrangement of LED segments disposed on the electrical socket, wherein each LED segment within the LED string array is coupled to another LED segment within the LED string array and wherein each LED segment within the LED string array is configured to represent the property associated with the power from the energy provider at a unique time segment form the predefined period of time.

16. The non-transitory computer readable medium of claim 15 wherein the property describes the mixture of the renewable energy source and the non-renewable energy source.

17. The non-transitory computer readable medium of claim 15 wherein the property describes the price for one unit of power.

18. The non-transitory computer readable medium of claim 15 wherein the data is received via a wide area network.

19. The non-transitory computer readable medium of claim 15, wherein the LED array is arranged in a semi-circle.

\* \* \* \* \*